United States Patent
Olsen, Jr.

(10) Patent No.: US 10,936,793 B2
(45) Date of Patent: Mar. 2, 2021

(54) EDITED CHARACTER STRINGS

(71) Applicant: SparxTeq, Inc., Orem, UT (US)

(72) Inventor: Dan Reed Olsen, Jr., Orem, UT (US)

(73) Assignee: SparxTeq, Inc., Orem, UT (US)

( * ) Notice: Subject to any disclaimer, the term of this patent is extended or adjusted under 35 U.S.C. 154(b) by 0 days.

(21) Appl. No.: 16/444,316

(22) Filed: Jun. 18, 2019

(65) Prior Publication Data
US 2020/0250257 A1    Aug. 6, 2020

Related U.S. Application Data

(60) Provisional application No. 62/801,785, filed on Feb. 6, 2019.

(51) Int. Cl.
*G06F 17/20* (2006.01)
*G06F 40/117* (2020.01)
*G09B 7/00* (2006.01)
*G06F 40/12* (2020.01)
*G06F 40/166* (2020.01)

(52) U.S. Cl.
CPC ............ *G06F 40/117* (2020.01); *G06F 40/12* (2020.01); *G06F 40/166* (2020.01); *G09B 7/00* (2013.01)

(58) Field of Classification Search
CPC ...... G06F 40/117; G06F 40/12; G06F 40/166; G09B 7/00
See application file for complete search history.

(56) References Cited

U.S. PATENT DOCUMENTS

| | | | | |
|---|---|---|---|---|
| 2009/0142742 | A1* | 6/2009 | Goldberg | G09B 7/02 434/362 |
| 2013/0157245 | A1* | 6/2013 | Basu | G09B 7/04 434/362 |
| 2014/0255886 | A1* | 9/2014 | Wang | G09B 5/00 434/169 |
| 2014/0377733 | A1* | 12/2014 | Olsen, Jr. | G09B 7/07 434/350 |
| 2015/0106705 | A1* | 4/2015 | Vuong | G06F 40/00 715/271 |
| 2015/0187225 | A1* | 7/2015 | Worsley | G09B 7/07 434/178 |
| 2016/0335904 | A1* | 11/2016 | Tashiro | G09B 7/02 |
| 2017/0068986 | A1* | 3/2017 | Chan | H04L 67/16 |

* cited by examiner

*Primary Examiner* — Keith D Bloomquist
(74) *Attorney, Agent, or Firm* — Phillips Winchester; Justin K. Flanagan

(57) ABSTRACT

An assessment system may present one or more string interaction problems to each of a plurality of students. Students may provide answers to string interaction problems in the form of string edits that, for example, identify deletions, additions, or revisions to a text string of each respective string interaction problem. The assessment system may normalize each string edit by converting each string edit into a student range edit. Each student range edit defines a replacement text string (which could be an empty text string) to be inserted within a range of reference locations relative to an original text string of the string interaction problem (which likewise could be an empty text string). An assessor may associate feedback objects with student range edits that match or, in some embodiments, are within a predetermined distance of an assessor-defined range edit.

10 Claims, 19 Drawing Sheets

*← 400*

| Relation | Description | Definition |
|---|---|---|
| A < B | Before | The string location referenced by A occurs earlier in the string than the location referenced by B |
| A == B | Same | The string locations A and B reference exactly the same character location |
| A > B | After | The string location referenced by A occurs later in the string than the location referenced by B |
| A <= B | Before or same | The string location referenced by A occurs earlier in the string than the location referenced by B or is the same location |
| A >= B | After or same | The string location referenced by A occurs later in the string than the location referenced by B or is the same location |

FIG. 4

| Relation | Definition |
|---|---|
| P disjoint Q | No character location C that is in P is also in Q |
| P contains Q | All character locations C that are in Q are also in P |
| P containedBy Q | All character locations C that are in P are also in Q |
| P intersects Q | There exists at least one character location C that is in both P and Q |

| Base string | Range | New string | Edited String |
|---|---|---|---|
| A fat brown fox | [2,5] | "skinny" | A skinny brown fox |
| A black pig | [2,7] | "" | A pig |
| One baby | [3,3] | "smiling" | One smiling baby |

| Alternate edit structure | Equivalent range edit set |
|---|---|
| Insert(7,"go") | Replace([7,7],"go") |
| Delete(6,7), Insert(8,"help") | Replace([6,7],""), Replace([8,8],"help") |
| Annotate(6,10,"a") | Replace([6,6],"<a>"), Replace([10,10],"</a>") |

FIG. 6C

| Description | From | To |
|---|---|---|
| Start <= End | [7,4] | [4,7] |
| Extend to word boundaries | This is some text [9,11] | This is some text [8,12] |
| Extend to line boundaries | This is several lines of text to select. | This is several lines of text to select. |

FIG. 6D

Once there was a large hippopotamus in the river.

Once there was a large alligator in the river.

FIG. 8A

Once there was a large hippopotamus in the river.

alligator

FIG. 8B

Once there was a large ~~hippopotamus~~ in the river.

Once there was a large <u>alligator</u> in the river.

FIG. 8C

Once there was a large ~~hippopotamus~~ <u>alligator</u> in the river.

FIG. 8D

... a large hippopotamus in...

alligator

FIG. 8E

EDITED CHARACTER STRINGS

RELATED APPLICATIONS

This application claims priority to U.S. Provisional Patent Application No. 62/801,785, titled "AUTOMATED GRADING ASSISTANCE FOR EDITED CHARACTER STRING QUIZZES," filed on Feb. 12, 2019, which is hereby incorporated by reference in its entirety.

TECHNICAL FIELD

This disclosure relates to graphical user interfaces, visual display systems, and other computer-assisted systems that facilitate feedback and assessment of edited character string data sets.

BRIEF DESCRIPTION OF THE DRAWINGS

This disclosure includes illustrative embodiments that are non-limiting and non-exhaustive. Reference is made to certain of such illustrative embodiments that are depicted in the figures described below.

FIG. 4 illustrates a table of various relationships for comparing two references.

FIGS. 6A-6D illustrate various tables of relationships, functions, and algorithms implemented by the system, according to various embodiments.

FIGS. 8A-8E illustrate various possible edit presentations, according to various embodiments.

DETAILED DESCRIPTION

Figure 1:
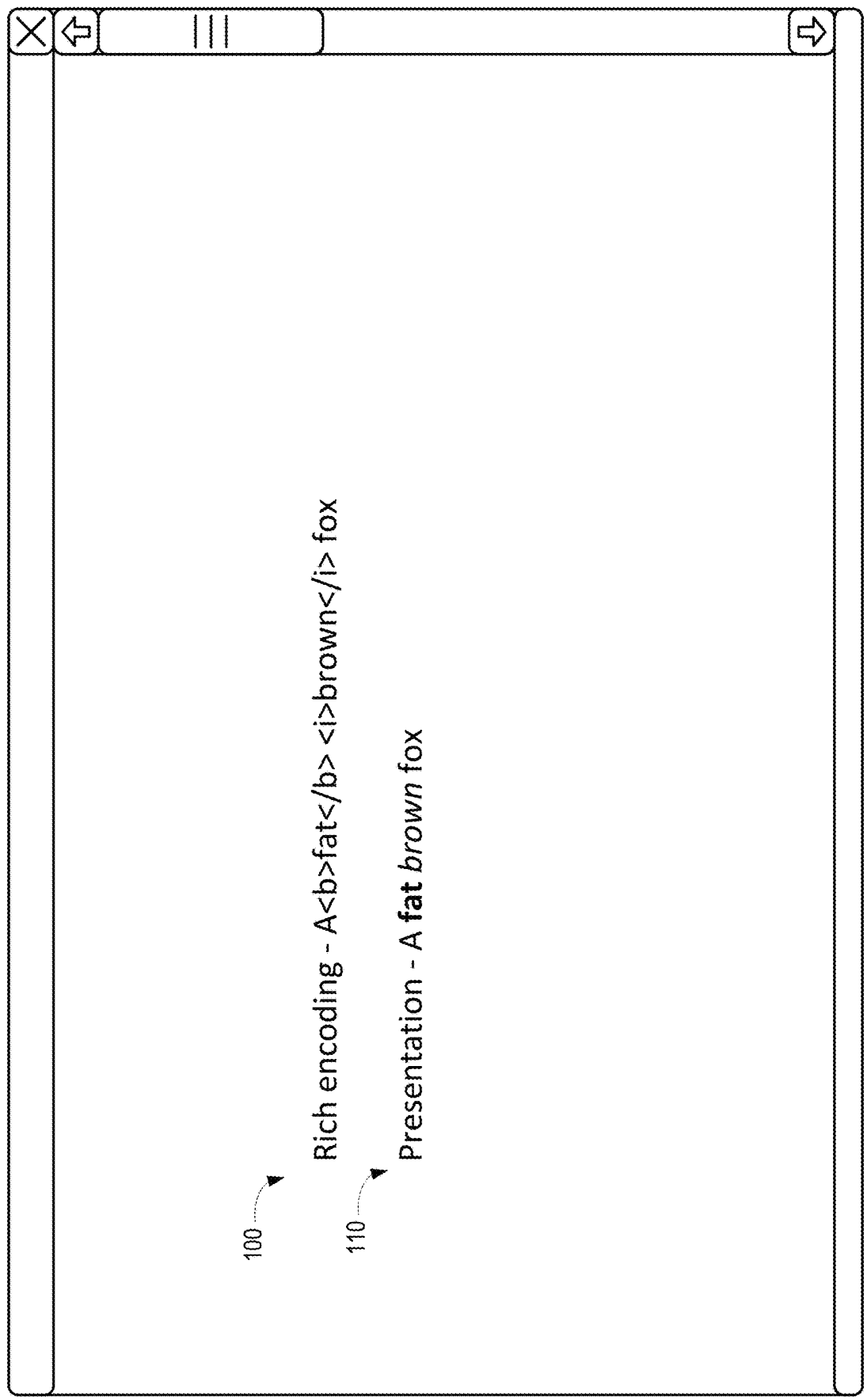
FIG. 1 illustrates an example of a rich string encoding and a possible presentation, according to one embodiment.

A fundamental component of education is the assessment of a student's learning. Teachers utilize assessments to assign grades but also for diagnosing deficiencies and recommending ways to improve a student's learning and/or the collective learning of a group of students. Similarly, it is useful to assess the abilities, knowledge, reasoning, memorization, and/or other capabilities of students or other assessees in a variety of situations, including education, training, certification, licensing, applications, and the like. One of the most time-consuming and tedious duties of a teacher or other assessor is the grading of assessment activities.

Automatic or semiautomatic mechanisms for grading assessments and providing feedback to students may improve the educational process. The current trend toward massive open online courses (MOOCs) highlights the need for less labor-intensive assessment strategies. When a class contains thousands or even tens of thousands of students, a teacher cannot reasonably hand grade all of the assessments and/or provide meaningful feedback. As the educational process becomes more independent, students and assessors may desire to administer additional assessments, quickly identify where learning has not occurred, and provide meaningful feedback. Without a teacher playing close attention, more assessments and/or improved feedback is needed to track student learning progress. With increased assessment comes an increased grading load that may overwhelm assessors and/or limit their ability to provide meaningful feedback.

The classic solution to automatic grading has been the multiple-choice question. These questions are straightforward to grade by hand, and technology to support automatic grading of multiple choice tests has existed for decades. Many students have answered quizzes by coloring in bubbles on a sheet to be scanned by an automatic grading machine. Within a classroom context, "clickers" have been used. These devices allow students to express one of several choices to a question posed by an instructor during class. The instructor gets immediate feedback on how many students selected the various answers. In computer-based coursework, multiple-choice answers may be indicated by radio button widgets that a student can select.

One limitation of multiple choice tests is that human knowledge is more complicated than can be reasonably represented by a multiple-choice test. Students develop strategies for eliminating choices and guessing at answers without developing a real understanding or sense of the material. Trying to assess more sophisticated concepts can be difficult or impossible to accomplish with traditional multiple-choice assessments. Some systems allow students to enter numbers that can be matched against correct answers. Others allow students to type words or short phrases and then provide various rules and schemes by which the instructor can define what a correct answer is. There is a continuing need for more sophisticated ways to pose assessment problems to students and associated approaches for automatically or semi-automatically grading their answers.

The present disclosure includes systems and methods relating to the administration, evaluation, and review of assessments, such as quizzes and tests. This disclosure describes, for example, the administration, evaluation, and review of assessments containing strings, as defined below. In particular, this disclosure relates to text strings that are editable by an assessee during an assessment. Answers to questions may be provided in the form of edited or otherwise marked-up strings. An assessor can evaluate and assign feedback to the assessees' answers.

The systems and methods described herein provide for selective display via interactive graphical user interfaces to facilitate semi-automatic assessment of the assessee answers by an assessor. Specifically, meaningful feedback can be automatically or semi-automatically provided by an assessor to the assessee with respect to one or more edited string answers.

According to various embodiments, a method for administering an assessment, such as a quiz or test, may include presenting a string interaction problem, as described below. Various systems and methods described herein relate to the creation, administration, and evaluation of string interaction problems. An assessment system for authoring, administering, and/or evaluating string interaction problems may include an authoring subsystem that allows string interaction problems to be created. The assessment system may alternatively or additionally include an administration subsystem that allows assessees to edit or create string interaction problems via an authoring subsystem. Assessees may provide string interaction answers.

The assessment system may include a grading subsystem that allows assessors to express grading criteria. The grading subsystem may apply the grading criteria provided by an assessor to multiple assessments at the same time (or substantially at the same time). In some instances, the grading subsystem may automatically apply the grading criteria provided by the assessor to multiple assessee answers without any or with limited assessor input. An answer (from an assessee) may be tagged as "graded" when one or more feedback objects have been applied to the answer. A feedback subsystem or module may facilitate the association of feedback objects with student answers created or formed by assessees.

In various embodiments, an assessment system may include all, some, or even just one of: the authoring subsystem, the administration subsystem, the grading subsystem, and the feedback subsystem. In some embodiments, disparate systems may each implement one of the authoring subsystem, the administration subsystem, the grading subsystem, and the feedback subsystem. In some embodiments, some of the subsystems may be implemented locally via hardware, software, and/or firmware and some of the subsystems may be implemented in a remote location (e.g., cloud-based user-controlled software or via a browser-based software-as-a-service ("SaaS")).

Additional description of various embodiments and implementations of the various assessment subsystems are provided below. Each of the various embodiments of subsystems described herein may be implemented as standalone systems or used in combination with other features or characteristics of other embodiments of the same subsystem or of different subsystems.

As used herein, an assessor includes anyone engaged in the creation of materials, delivery of materials, or evaluation of materials or individuals. Examples of an assessor include, but are not limited to, an individual; a group of teachers, instructors, supervisors, trainers, certifiers, licensors, application evaluators, or admissions evaluators; and/or other individuals or agencies engaged in evaluating an ability or a knowledge of one or more assessees.

As used herein, an assessee includes anyone assessed via an assessment by an assessor or assessment system. Examples of assessees include, but are not limited to, individuals; groups of students, trainees, instructees, supervised employees or supervised volunteers, those seeking licensure, those seeking admission, or applicants; and/or others engaged in demonstrating an ability or knowledge to one or more assessors.

As used herein, text may include both image-based text and machine-encoded text. For example, text may include a sequence of data codes that represent the components of some written language. The sequence of data codes is capable of being rendered by an algorithm running on a computer to produce a human readable version of the source written language.

As used herein, a string includes a sequence or array of characters used to form words, sentences, descriptions, or the like, frequently in textual form. Strings generally have encodings that translate binary numbers or sequences of binary numbers into actual characters from some language. Examples of such encodings include 8-bit encodings such as ASCII or ISO-Latin. Other example encodings, such as UNICODE, may use more than 8 bits to allow for the representation of disparate character sets in various languages. The characters may correspond directly to the language and may include various punctuation, such as comma, period, colon, etc. The characters may also include a wide variety of symbols such as spaces, line feeds, tabs, and the like.

One or more "presentation algorithms" can translate a character string into a visual representation that can be read by human beings. Presentation algorithms may, for example, be parameterized by a font. Some strings, referred to herein as "rich strings" have additional embedded information to identify the content of portions of a string, to control the presentation of the content, and/or identify edits made to the strings. HTML is an example of a rich string representation. Rich strings may encode portions of the string with tags, such as XML, HTML, XML grammars, Document Type Definitions, and/or a wide variety of alternative tag types. Examples of such tags, such as <b> and </b> for start bold and end bold, <i> and </i> for start italics and end italics, may be utilized.

In HTML, tags are generally indicated by angle brackets. There are also other HTML encodings such as < that indicates when an angle bracket "<" is not part of a tag. There is a wide variety of alternative string encoding that may be utilized to form rich strings, such as Microsoft's RTF (Rich Text Format). There are also binary encodings where the control codes are not coded as characters but as special-purpose binary codes. These encodings are frequently used internally to programs as a more efficient means of representing a rich string.

The Domain Object Model (DOM) used to manipulate HTML in many web browsers is an example of a rich string tree. A particular location within a string may be referenced to facilitate editing and other actions. For example, a string may be associated with (e.g., include) data encoding the location of a particular character or set of characters in the string, referred to as a "string location reference." A string location reference may be used for editing strings. In some embodiments, a string location reference that identifies a particular character may reference the space between characters, rather than the character itself. For example, a string location reference to a character "z" can also be considered a reference to the location between "z" and the character that appears immediately in front of (or behind) "z."

A string location reference can be an index that, for example, begins with 0 for the first character and ends with an integer N for the last character. In the context of a rich string tree, a path reference may be used to identify a sequence of references that locate a node in a tree and subsequent sub-trees.

In the context of the terminology described above and in other locations herein, the assessment system presents a series of strings to a student as part of challenge problems. A student provides an answer via an administration subsystem by indicating changes (e.g., edits) to the string of text. The student's changes can be recorded as "edit structures" as described in greater detail below. A professor may provide feedback relative to a particular student answer. Because the student answer comprises a data encoding of changes to be made to a string, the student answer may be similar or even identical to other student answers indicating the same or substantially similar changes to the string. As described in greater detail below, such student answers may be referred to as string edits, or the equivalent range edits or range edit set. The professor's feedback with respect to a particular change/edit to the string may be automatically applied to each student answer indicating a similar change/edit.

The system reduces the total number of feedback objects that must be manually assigned or applied by the professor. To provide a specific numerical example, a professor assigns a quiz with a paragraph for editing by each of 100 students. Edited correctly for a perfect score, a student would make 25 edits to the paragraph. Some students make all 25 correct edits, some students make fewer correct edits, and some students make incorrect edits. Normally the professor would be required to grade all 100 paragraphs and assign feedback to all edits associated with all 100 paragraphs. While perhaps this is possible for a class of 100 students, it becomes nearly impossible for a class of 1,000 or 5,000 students.

The 100 students may have made an average of 22 edits per student, for a total of 2,200 edits for the professor to review. However, many students will have identical correct answers, and it is likely that many of them will make the same mistake. In our example, it is conceivable that the 2,200 total edits may only consist of 55 unique edits—25 of which are correct answers and 30 of which are incorrect. In traditional manual grading processes, whether performed on paper or on a computer electronically, the professor would assign feedback to all 2,200 edits. Because of the amount of work required, the professor may opt to simply reduce the consistency of grading and the amount of feedback by assigning a single score to the entire paragraph. Such a shortcut may reduce the professor's workload, but it comes at the cost of consistency in grading and the loss of meaningful, granular feedback to the students.

The presently described systems and methods enable a systematic and computer-processable approach for associating student answer "edits" with strings and rich strings in a way that allows for computer analysis and comparison for automatic or semi-automatic grading. In the example above, the professor will only need to associate feedback objects with 55 total edits. Each time feedback is associated with an edit, the feedback is automatically assigned to every other student answer with the same edit.

As used herein, a rendering includes the process of converting some data structure into an image that can be displayed to a human being. There are many possible such data structures including HTML, Scalar Vector Graphics (SVG), and PostScript, to name a few. Presenting and displaying can be performed via any of a wide variety of audio, visual, haptic, and/or other electronic delivery approaches, including, but not limited to electronic displays, speakers, electronic reader devices, electronic braille devices, cell phones, laptops, computers, projectors, personal electronic devices, and/or the like.

As used herein, a drawing includes a data structure that can be rendered into an image. For example, a drawing may include a data structure that includes a list of graphics primitives. Graphics primitives are geometric shapes such as lines, circles, ovals, polygons, curves, images, etc. The rendering process includes taking each geometric primitive and performing its drawing operation that converts that primitive into pixel changes in an image. There are many graphics packages that define sets of drawing instructions from which a drawing can be assembled. These include X-Windows, PDF, PostScript or Microsoft RDP. A drawing may also be represented as a data structure of display primitives from which the visual presentation of the drawing can be generated. Examples of this include Microsoft WPF, Java FX, VRML, OpenGL or HTML.

As used herein, the term video includes a data representation of a sequence of images that can be presented to a human being at a rate sufficient to be perceived as continuous motion. This also includes data representations capable of presenting continuous motion whether the content of that data representation actually contains continuous motion, or not. Video may optionally include audio that is synchronized with the image sequence.

As used herein, audio includes any data representation of sound. This would include any form of data from which an algorithm running on an appropriately configured computer could produce sounds audible to human beings.

Digital media includes any combination of text, drawing, image, digital ink stroke, audio, and/or video. In some embodiments, a digital media creation tool is embodied as software that allows a user to create one or more types of digital media. The creation of digital media comprises interactive manipulations by the user through one or more acquisition devices such as scanners, microphones, or cameras, and/or a combination thereof. In some embodiments, digital media includes references to external digital media, such as URLs.

As used herein, a click includes a brief indicator of a two-dimensional point using some interactive input device. Examples of a click include the press and release of a computer mouse button, a tap on a touchscreen with the finger, or a tap of a stylus on a tablet or other personal computing device. The click may be a single two-dimensional point that is indicated and for which the expression of the point is brief.

As used herein, a drag includes an indication of the movement of some object on a display screen. In some embodiments, a drag is initiated by the indication of a two-dimensional start point. This start point selects the displayed object to be moved. In a subsequent movement phase, the user identifies one or a series of new two-dimensional points to which the object is successively moved. After one or more "movement points" there is a final drop point that indicates the two-dimensional point where the object should be dropped. A similar movement sequence can be used to drag an object through a three-dimensional space.

Examples of dragging include: pressing a mouse button to start the drag, moving the mouse while holding down that button and then releasing that mouse button at the drop point. A stylus press, move, and release can be used as a drag. A finger touch, hold down while moving, and lift can be used as a drag.

Embodiments of an assessment system and/or component parts, associated systems, and subsystems may include various steps, which may be embodied in machine-executable instructions to be executed by a computer system. A computer system may be embodied as a general-purpose or special-purpose computer (or other electronic devices). The computer system may include hardware components that include specific logic for performing the steps or may include a combination of hardware, software, and/or firmware.

In various embodiments, the security of assessment devices may be enhanced by implementing all or some of the systems and subsystems described herein via stand-alone special purpose devices. Embodiments may also be provided as a computer program product including a computer-readable medium having stored thereon instructions that may be used to program a computer system or other electronic device to perform the processes described herein. The computer-readable medium may include, but is not limited to: hard drives, floppy diskettes, optical disks, CD-ROMs, DVD-ROMs, ROMs, RAMs, EPROMs, EEPROMs, magnetic or optical cards, solid-state memory devices, or other types of media/computer-readable media suitable for storing electronic instructions.

Computer systems and the computers in a computer system may be connected via a network. Suitable networks for configuration and/or use as described herein include one or more local area networks, wide area networks, metropolitan area networks, and/or Internet or IP networks, such as the World Wide Web, a private Internet, a secure Internet, a value-added network, a virtual private network, an extranet, an intranet, or even standalone machines which communicate with other machines by physical transport of media. In particular, a suitable network may be formed from parts or entireties of two or more other networks, including networks using disparate hardware and network communication technologies.

One suitable network includes a server and several clients; other suitable networks may contain other combinations of servers, clients, and/or peer-to-peer nodes, and a given computer system may function both as a client and as a server. Each network includes at least two computers or computer systems, such as the server and/or clients. A computer system may include a workstation, laptop computer, disconnectable mobile computer, server, mainframe, cluster, so-called "network computer" or "thin client," tablet, smartphone, personal digital assistant or other hand-held computing device, "smart" consumer electronics device or appliance, medical device, or a combination thereof.

Suitable networks may include communications or networking software, such as the software available from Novell, Microsoft, Artisoft, and other vendors, and may operate using TCP/IP, SPX, IPX, and other protocols over twisted pair, coaxial, or optical fiber cables, telephone lines, radio waves, satellites, microwave relays, modulated AC power lines, physical media transfer, and/or other data transmission "wires" known to those of skill in the art. The network may encompass smaller networks and/or be connectable to other networks through a gateway or similar mechanism.

Each computer system includes one or more processor and/or memory; computer systems may also include various input devices and/or output devices. The processor may include a general-purpose device, such as an Intel®, AMD®, or other "off-the-shelf" microprocessor. The processor may include a special purpose processing device, such as an ASIC, SoC, SiP, FPGA, PAL, PLA, FPLA, PLD, or other customized or programmable device. The memory may include static RAM, dynamic RAM, flash memory, one or more flip-flops, ROM, CD-ROM, disk, tape, magnetic, optical, or another computer storage medium. The input device(s) may include a keyboard, mouse, touch screen, light pen, tablet, microphone, sensor, or other hardware with accompanying firmware and/or software. The output device (s) may include a monitor or other display, printer, speech or text synthesizer, switch, signal line, or other hardware with accompanying firmware and/or software.

The computer systems may be capable of using a floppy drive, tape drive, optical drive, magneto-optical drive, or other means to read a storage medium. A suitable storage medium includes a magnetic, optical, or other computer-readable storage device having a specific physical configuration. Suitable storage devices include floppy disks, hard disks, tapes, CD-ROMs, DVDs, PROMs, RAM, flash memory, and other computer system storage devices. The physical configuration represents data and instructions which cause the computer system to operate in a specific and predefined manner as described herein.

Suitable software to assist in implementing the invention is readily provided by those of skill in the pertinent art(s) using the teachings presented here and programming languages and tools, such as Java, Pascal, C++, C, database languages, APIs, SDKs, assembly, firmware, microcode, and/or other languages and tools. Suitable signal formats may be embodied in analog or digital form, with or without error detection and/or correction bits, packet headers, network addresses in a specific format, and/or other supporting data readily provided by those of skill in the pertinent art(s).

Several aspects of the embodiments described will be illustrated as software modules or components. As used herein, a software module or component may include any type of computer instruction or computer-executable code located within a memory device. A software module may, for instance, include one or more physical or logical blocks of computer instructions, which may be organized as a routine, program, object, component, data structure, class, etc., that perform one or more tasks or implement particular data types. It is appreciated that a software module may be implemented in hardware and/or firmware instead of or in addition to software. One or more of the functional modules described herein may be separated into sub-modules and/or combined into a single or smaller number of modules.

In certain embodiments, a particular software module may include disparate instructions stored in different locations of a memory device, different memory devices, or different computers, which together implement the described functionality of the module. Indeed, a module may include a single instruction or many instructions and may be distributed over several different code segments, among different programs, and across several memory devices. Some embodiments may be practiced in a distributed computing environment where tasks are performed by a remote processing device linked through a communications network. In a distributed computing environment, software modules may be located in local and/or remote memory storage devices. In addition, data being tied or rendered together in a database record may be resident in the same memory device, or across several memory devices, and may be linked together in fields of a record in a database across a network.

As described herein, an assessment system may include an authoring subsystem, an administration subsystem, a grading subsystem, and/or a feedback subsystem. According to various embodiments, an authoring subsystem may be embodied as hardware, firmware, software, or a combination thereof. The authorizing subsystem may be used by an assessor to create an interactive string-based problem or question. In various embodiments, multiple answers from multiple students may be aggregated and displayed numerically to indicate the total number of common responses.

In many instances, the terms instantaneously, at the same time, immediately, and simultaneously are used herein in the colloquial sense based on the visual perception of a user. Specifically, the term "instantaneously" is used herein as a term that modifies some task or action. Since no task in the physical world happens in zero time. In the context of human users interacting with computing devices, the term "instantaneously" can refer to a task or action that is completed within approximately 2 seconds.

The term "immediately" can be used to modify a task or action as well. In the context of human users interacting with computing devices, the term "immediately" can refer to a task or action that happens fast enough to not significantly delay a user in achieving a goal. For instance, "immediately" may be used to describe tasks or actions that are completed in less than 10 seconds.

The term "simultaneously" is used herein to describe the interactive presentation of a plurality of data objects. Data objects may be described as being presented or displayed "simultaneously" when all of the data objects are presented for human perception for approximately the sampling speed of the human eye (e.g., approximately $\frac{1}{30}^{th}$ of a second). Data objects that are on the screen at the same time for less than $\frac{1}{30}$th of a second are unlikely to be perceived by a user.

As used herein, the term "plurality" refers to a quantity greater than one (1). Many benefits of the systems and methods described herein are more fully realized in the context of processing a large number of assessees, student answers, string answer grade rules, range edit matching, string distance calculations, etc. As used herein, a specific term "large plurality" is used to refer to quantities in excess of approximately twenty (20).

When interacting visually, it is sometimes important for a user to clearly distinguish between the members of two or more sets of objects being displayed. Displayed objects have visually salient differences when a user can readily identify and distinguish between two objects belonging to different sets. There are a variety of ways to exhibit visually salient differences including, for example, but without limitation: displaying them in different colors, displaying one set with dotted lines and one set with solid lines, putting a border around the objects of one set and not around the objects of the other set, and the like.

The embodiments of the disclosure are described below with reference to the drawings, wherein like parts are designated by like numerals throughout. The components of the disclosed embodiments, as generally described and illustrated in the figures herein, could be arranged and designed in a wide variety of different configurations. Furthermore, the features, structures, and operations associated with one embodiment may be applied to or combined with the features, structures, or operations described in conjunction with another embodiment. In other instances, well-known structures, materials, or operations are not shown or described in detail to avoid obscuring aspects of this disclosure.

Thus, the following detailed description of the embodiments of the systems and methods of the disclosure is not intended to limit the scope of the disclosure, as claimed, but is merely representative of possible embodiments. In addition, the steps of a method do not necessarily need to be executed in any specific order, or even sequentially, nor do the steps or sequences of steps need to be executed only once or even in the same order in subsequent repetitions. As used herein, the term "set" may include a non-zero quantity of items, including a single item.

FIG. 1 illustrates an example of a rich string encoding 100 and a possible presentation 110, according to one embodiment. As previously noted, rich strings have additional embedded information to identify the content of portions of a string, to control the presentation of the content, and/or identify edits made to the strings. In the illustrated embodiment, tags are used to identify a portion of the string for bold display and another portion for display in italics.

Figure 2:
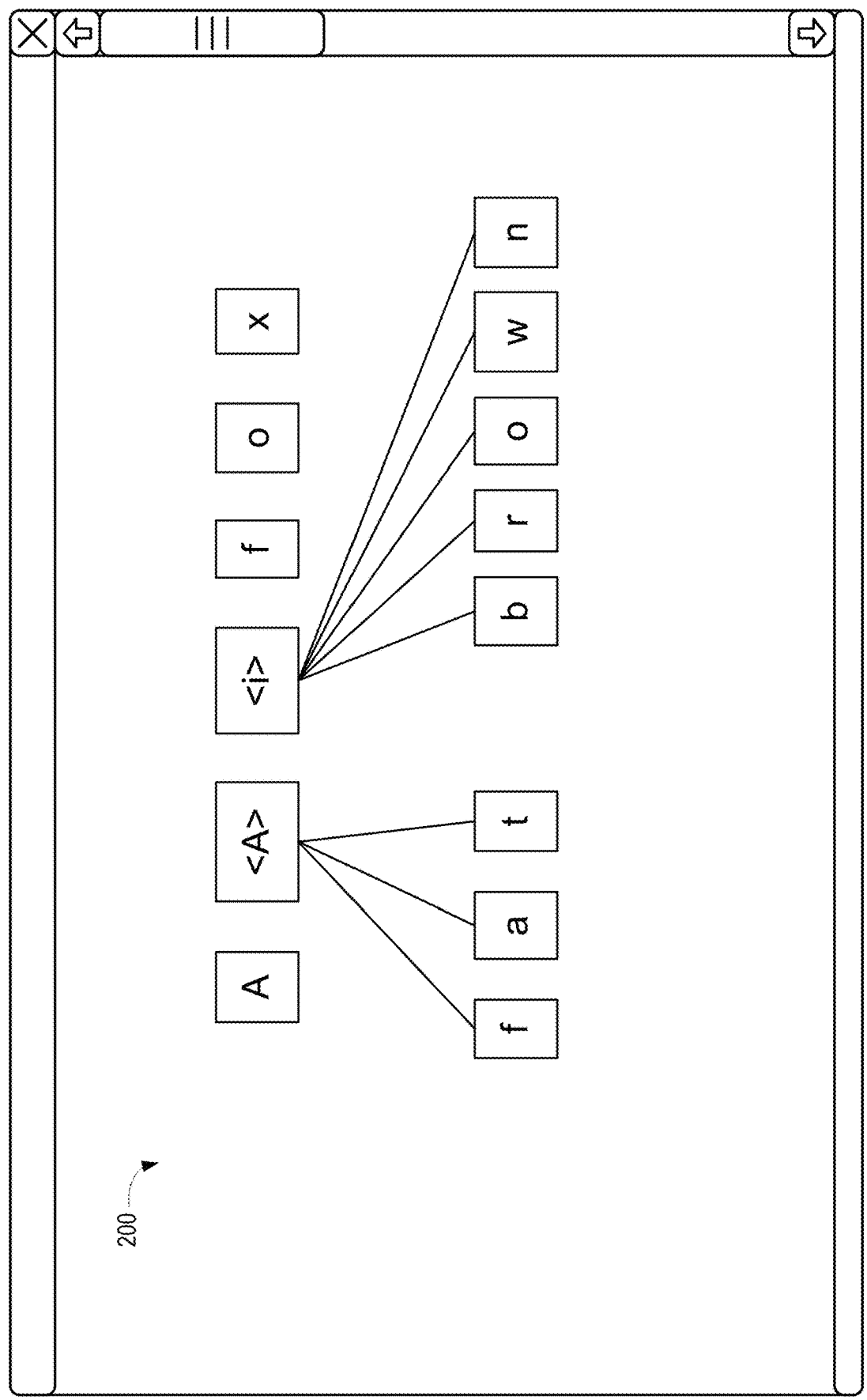
FIG. 2 illustrates a rich string tree representation of the rich string from FIG. 1, according to one embodiment.

FIG. 2 illustrates a rich string tree 200 representation of the rich string from FIG. 1, according to one embodiment. A rich string tree 200 can generally be created when control codes of a rich string occur in pairs (as in HTML). As previously noted, the Domain Object Model (DOM) used to manipulate HTML in many web browsers is an example of a rich string tree.

A "path reference" may be used in conjunction with rich string trees, which can be used to locate a character within the tree. A path reference can be expressed as a sequence of references where each reference locates a node in the tree and subsequent references refer to the sub-tree. For example, the path reference [2,1] can be applied to the rich string tree 200 to reference the character "r." The "2" references the <i> node at the top of the tree and the "1" references the "r" node inside of the <i> node.

Figure 3:
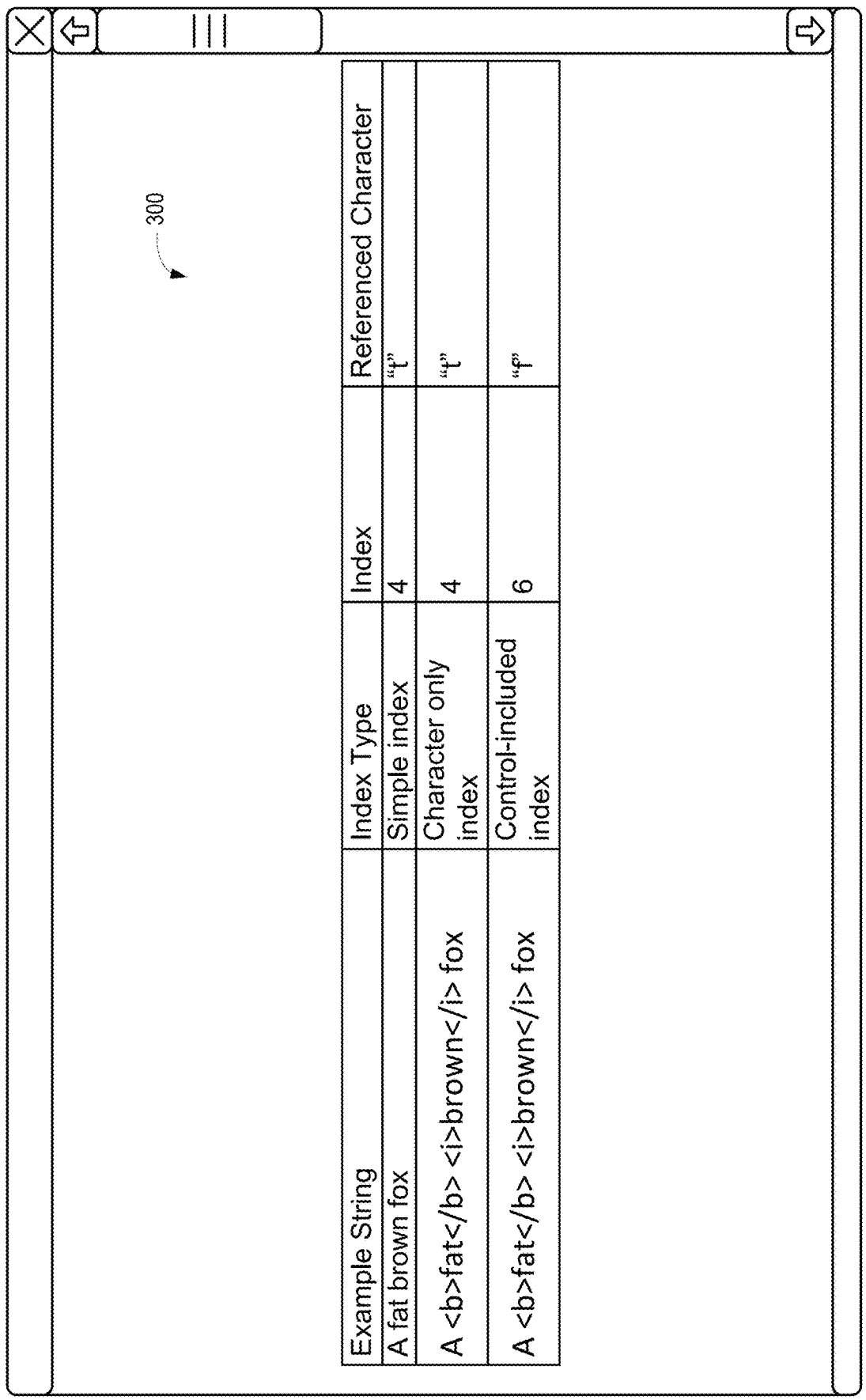
FIG. 3 illustrates some examples of types of string index references, according to one embodiment.

FIG. 3 illustrates some examples of types of string index references 300, according to one embodiment. The first row of the table includes column titles. The second row provides a simple index type for the string "A fat brown fox" as having an index value of 4 with a referenced character of "t" because the "t" is the fourth character in the string.

The third row includes a character only index of a rich text string with bold and italics paired tags. Again, the index value of 4 corresponds to the referenced character "t" because the index type is "character only index." The fourth row is a control-included index such that the index value of 6 for the same string corresponds to the referenced character "f."

FIG. 4 illustrates a table 400 of various relationships for comparing two references. The assessment system may utilize various algorithms to compare selections and apply edits and feedback correctly. Relationships in the first column define various relationships between references "A" and "B." The definitions in the third column are self-explanatory and correspond to standard operators in mathematical equations and are described in the second column.

FIG. 4 merely provides example relationships and it is appreciated that additional relationships may be defined and/or employed in one or more matching algorithms for grading, feedback assignment, and/or identifying or applying edits. For example, a relationship "/4" may be used to define a relationship in which the string location referenced by A is located within four characters of the string location referenced by B. Operators for wildcards, Excludes ( ) AND, OR, Groups ( ) Around ( ) etc. may also be defined by default in the system and/or through user customization.

Figure 5:
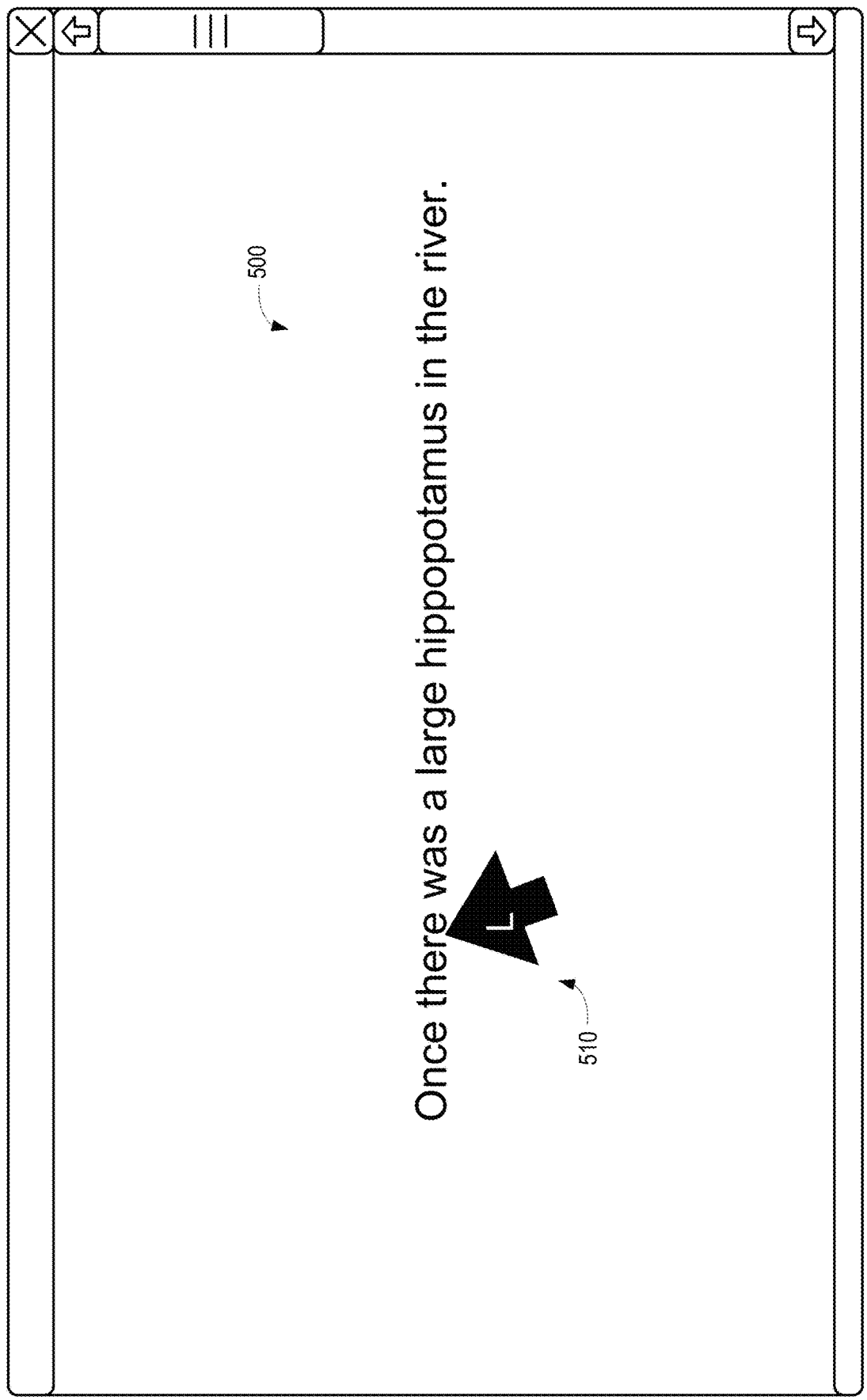
FIG. 5 illustrates the presentation of a string with a selection encoded as a string location reference, according to one embodiment.

FIG. 5 illustrates the presentation of a string 500 with a selection 510 at the location indicated by the arrow at point L that can be encoded as a string location reference, according to one embodiment. When a student or other assessee interacts with a string through a user interface (e.g., touch screen, browser window, tablet, mobile phone, etc.) the system allows for a location selection. A selection is an interactive behavior that specifies either (i) a string location reference or (ii) a string location range. A string location range comprises a pair of string location references [A,B] such that A<=B where the range specifies all character locations C such that A<=C and C<B. A single string location reference A can also be represented by a range [A,A].

In FIG. 5 the system may translate location L 510 into the index range [9,9] in the example. String Location L can be expressed by a mouse, a trackball, an electronic pen, a touch sensor, or any other locator device. A selection location may also be modified by arrow keys to move forward or backward through the string references. Using any of a wide variety of methods for selection, the user may select a single point and/or a range selection via the graphical user interface. Given some range R=[A,B] we can use the notation R.start to reference the location A and R.end to reference the location B.

FIG. 6A illustrates a table 600 of relationships between two selection ranges P and Q. For example, a professor may define a selection range P and associate a written feedback of "this is the book title and should be italicized." Different point values may be assigned for P=Q, P Disjoint Q, P Contains Q, P ContainedBy Q, and P Intersects Q.

An edit structure, consistent with prior usage, may include a data structure that contains sufficient information to uniquely modify a given base string into an edited string. In object-oriented notation, this says that an edit structure A can have a method apply( ) such that: A.apply(baseString) =>editedString. An example of an edit structure is a function "range replacement edit structure," which comprises a range and a new sequence of characters. The characters within the range in a base string are replaced by the new sequence of characters.

FIG. 6B illustrates an example of range replacement edit structure functions 610, according to various embodiments. As illustrated, replacing range [2,5] in the string "A fat brown fox" with new characters "skinny" results in an edited string "A skinny brown fox." Similarly, replacing range [2,7] of the base string "A black pig" with " " results in an edited string "A pig." Finally, in the third row a base string "One baby" has the new string "smiling" replace range [3,3] to generate the edited string "One smiling baby."

A general representation of all string edits may be created by collecting one or more range replacements into a "range edit set." As demonstrated herein, any string edit can be represented as a range edit and any set of string edits can be represented as a range edit set. A range edit set may be applied to a base string by identifying a set of ranges and a set of corresponding new strings to replace each range in the range set. In some embodiments, ranges are defined relative to the total number of words in a sentence, paragraph, page, or on a specific displayed line. Ranges may be defined in a way that allows for variation in displays.

Thus, while the ranges described herein provide start and stop characters and are defined with respect to a base string, in other embodiments, the ranges may be defined with respect to individual words, sentences, lines, paragraphs, pages, page breaks, chapters, books, documents, etc. In some embodiments, range notations may include more than start and stop (e.g., [2,5). For example, ranges may be defined by four numbers to show page, paragraph, start character, stop character. Any of a wide variety of variations may be made to the various notations and available specificity of the illustrated examples.

FIG. 6C illustrates a table 630 of a few examples of alternative edit structures that can be implemented by the system in the form of an algorithm as, for example, range edit sets. In the illustrated example, an alternative edit structure insert(7,"go") may be represented by the equivalent range edit set Replace([7,7],"go"). Similarly, Delete(6, 7), Insert(8,"help") may be represented by the equivalent range edit set Replace([6,7],""), Replace([8,8],"help"). The final example in FIG. 6C shows Annotate (6,10,"a") represented by the equivalent range edit set Replace([6,6],"<a>"), Replace([10,10],"</a>").

The assessment system may compare two edit structures A and B for equivalence based on a determination that A.apply(S)==B.apply(S) for all possible strings S. By mapping edit structures to their range equivalents, edit structures A and B can be compared for equivalence. Range equivalent edits allow for a wide range of expressed editings of strings to be compared with one another using the single notation of range replacement.

The system may determine a distance between two range edit structures A and B that have the same range, but different replacement strings, as the distance between the strings A.replace and B.replace. Any one of a plurality of algorithms for computing distance between two strings, such as the Levenstein distance algorithm or the minimal edit distance, may be utilized to determine a distance between the two strings.

The assessment system can compute a distance between any two string references R and Q. For example, the assessment system may calculate a simple distance based on the number of characters in the base string between R and Q. The assessment system may alternatively compute a distance between R and Q as the sum of the costs associated with each character in the base string between R and Q. For example, the costs of white space and punctuation may be defined as much higher than letters such that references that map into different words would be defined as more different than references to characters in the same word. Similarly, the system may define line or paragraph boundaries to have relatively higher costs such that references into different lines or paragraphs are computed as even more different.

The assessment system may compute a distance function D(A,B) between two edit structures. As a specific example, an edit structure distance function (EDF) between edit structures may be computed as a weighted sum of a reference distance function RDF and a string distance function SDF. According to various embodiments, the edit distance function between edit structures A and B is calculated as: EDF(A,B)=X*RDF(A.start,B.start)+Y*SDF(A.replace, B.replace)+Z*RDF(A.end, B.end), where X, Y, and Z are coefficients that can be adjusted to vary the importance of the range locations relative to the replacement strings.

In alternative embodiments, the assessment system may utilize different distance functions to determine a distance between two ranges (e.g., a reference distance and a string difference). The assessment system may also or alternatively compute a similarity function. The similarity function may have a maximum value when two edit structures are identical. The similarity function S(A,B) and the distance function D(A,B) related such that the similarity function S(A,B) can be converted into a distance function D(A,B). For instance, the distance function D(A,B) may be equal to a maximum similarity value less the computed similarity function S(A,B), such that D(A,B)=max-S(A,B).

FIG. 6D illustrates a table 640 of three examples of possible normalizations. The assessment system may normalize an edit set via a normalization algorithm to convert an edit set to a standard form. The system may normalize an edit set to compare edit sets for similarity. For example, if the range is defined with a higher number first, then the start and end of the range may be switched, as in the first row. In the second row, if a word is partially selected with a range [9,11], the range may be normalized to extend the selection to the word boundaries [8,12]. In the third row, an example of normalization may include extending selections to line boundaries.

As previously noted, assessors (e.g., teachers, professors, etc.) may utilize the assessment system to create one or more string interaction problems to form a quiz, test, or other assessment. Assessors may provide answers to string interaction problems. Consistent with prior usage, a string interaction problem may include a drawing that defines the problem, including information about what the problem is and what a solution should look like. In addition, a string interaction problem has one or more editable string controls. An editable string control has a base string and a user interface that allows the assessee, such as a student, to edit the base string. The student may provide a student answer to the string interaction problem in the form of an edited string. The student's answer to a string interaction problem comprises an edit structure for each editable string control in the problem.

One possible way to divide the student's answers is to convert each student edit via the user interface and translate that edit into an edit structure. For example, typing a string may create an insert edit structure. Using backspace or delete may create a delete edit structure. Other operations can similarly be encoded as edit structures. Another approach is to create a diff function such that diff(baseString, editString)=>edit structure E such that E(baseString)=>editString. String differencing algorithms may be part of a source-code control system.

The system may present a string according to presentation instructions embedded in a rich string. The system may present a normal string according to a default set of presentation rules. The system may, for example, display the string on a digital screen. The system may implement a referenceSelection function to convert a point location P on the digital screen into a string reference. For example, if a student clicks on the presentation at mouse point M and then types string S, this operation can be converted into a range edit of the form Replace([referenceSelection(M),referenceSelection(M)],S).

As another example, a student may press the mouse button down at point D and let it up at point U followed by typing string S. The system can convert the selection and typed string into the range edit format as Replace([referenceSelection(D),referenceSelection(U)]S). A wide variety of screen interactions can be converted into range edit structures. For example, a student may interactively create an edit structure by dragging and dropping a string, S, onto a location, D. The system may encode the edit structure as Replace([referenceSelection(D),referenceSelection(D)],S). The system may encode edit structures based on any string input at any location on the display. Thus, the system may encode student answers provided by the student typing, editing, or selecting strings in the context of a location on the display.

In some embodiments, the system may simplify the grading of a string interaction problem by restricting edits to particular portions of the base string. The system may restrict some edits by default and other edits may be restricted by an assessor during the creation of the string interaction problem. Such restrictions may limit the student's choices of edits which may have pedagogical benefits, particularly for beginners. Such restrictions can also limit the set of possible edits that a human grader must consider.

The system may encode the editing constraints. For example, the system may encode the editing constraints by generating a "blacklist" of ranges such that no edit structure may include any references inside of any of those ranges. In another embodiment, the system may generate a whitelist of ranges within which any edit structure created by a student must reference only characters therein. In yet another embodiment, the system may implement a tagged edit strategy in which the system embeds tags in the base string associated with sections of the string that can be edited. In each of these embodiments, the system ensures that the set of editing constraints restricts modifications to the base string of a string interaction problem.

In some embodiments, the system may constrain the types of edits that students can perform to select ranges within the base string. For example, the system may limit edit structures to the white space between characters in the base string.

Figure 7:
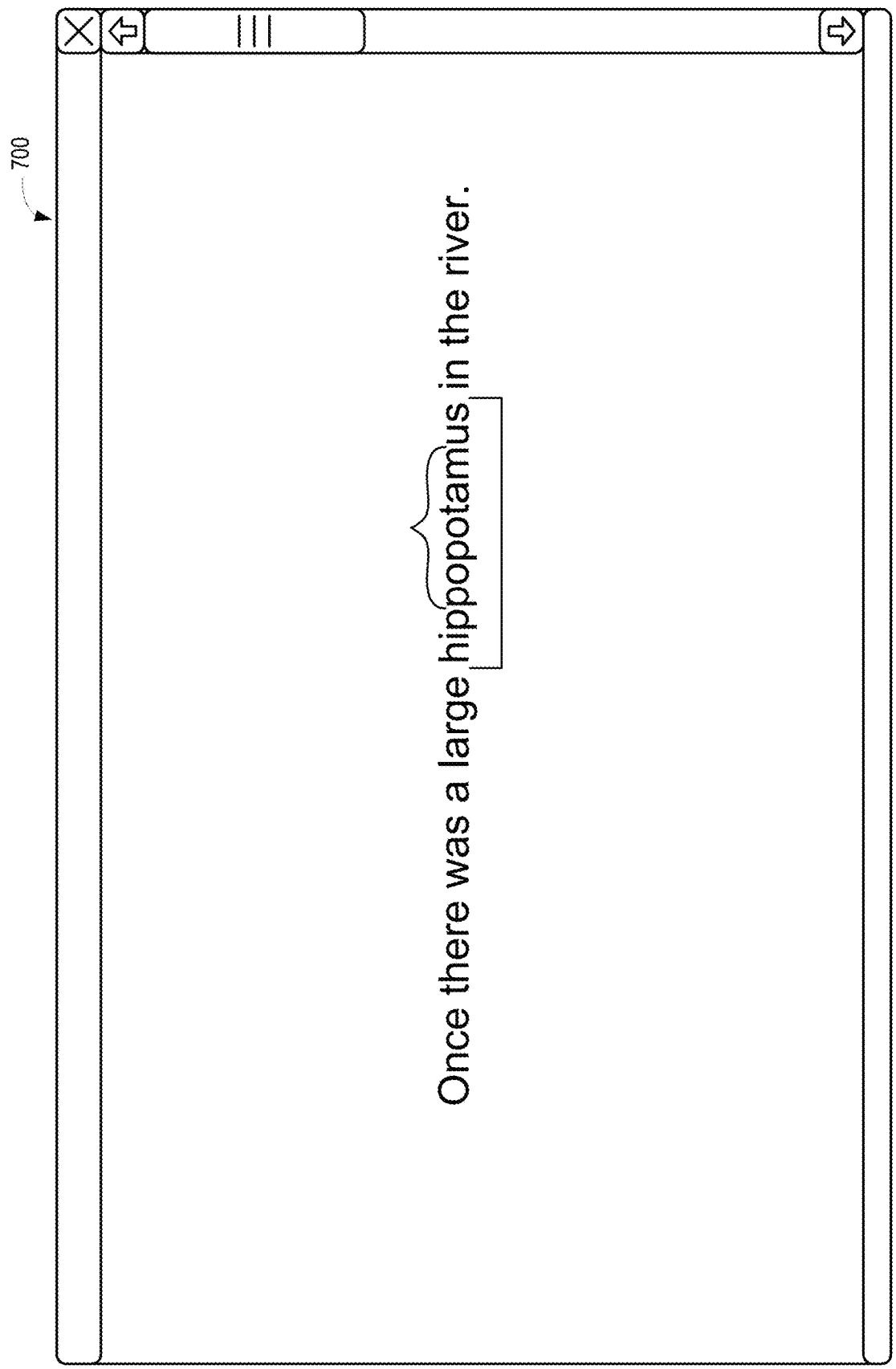
FIG. 7 illustrates a constrained range string interaction with a selected range for an edit, according to one embodiment.

FIG. 7 illustrates a string 700 with a white space range constraint interaction with a selected range for editing by a student providing an answer in the form of an edit structure, according to one embodiment. The range is automatically adjusted to white space as shown by the square brace below the base string. In another embodiment, the system may implement a punctuation range constraint that allows for edit structures that include modifications to punctuation marks as well as white space.

In some embodiments, the string may be provided in the context of a programming language or some other structured text for which there is a well-defined tokenization of the string. In such embodiments, the system may implement a tokenized range constraint that normalizes the selection range to the boundaries of the token. The system implementing one or more of these constraints serves to limit the variety of possible edits that a student can make to the string, thereby reducing the number of possible edits that a human grader would have to consider.

As previously noted, a student answer to a string interaction problem comprises an edit structure that defines changes the student makes to the base string. As previously noted, the student answer edit structure may be converted to a range edit structure and may be normalized pursuant to editing and/or range constraints associated with the string interaction problem.

A teacher or other assessor may associate one or more feedback objects with each range edit made by the student as part of the student answer. A feedback object may, for example, comprise a data structure that can be rendered into visual, haptic, and/or aural form. The feedback object, in many embodiments, may provide a numerical score, a letter grade, a corrected answer, an explanation of the correct answer, and/or other information indicative of the correctness of the answer. Examples of feedback objects include, for example, text, HTML, video, images audio or hyperlinks to other such information. The grading system or subsystem may associate one or more feedback objects with the student answer or, more specifically, the edit structure forming the student answer. The system may associate the feedback object with the student answer as, for example, a pointer, a key, an index, or a name.

In various embodiments, the system improves on existing grading approaches, whether done manually with a pen and paper, using multi-choice scanned grading sheets, and/or grading of individual electronic documents (e.g., grading of PDFs or scanned images). A string problem grading system or subsystem may include an "edit presentation." An edit presentation is a graphical representation of the change or changes that a single range edit will make to the base string.

FIGS. 8A-8E illustrate changes made to a base string according to various possible edit presentations of range edit equivalents. The edit presentation can show a human grader (e.g., the assessor) the edits to the base string. The string problem grading system may be used to grade one student's answers or may also be used to grade the answers of multiple students simultaneously by an automatic association of feedback objects with equivalent range edits. The base string for each of FIGS. 8A-8E is "Once there was a large hippopotamus in the river."

FIG. 8A illustrates a complete replacement of the string below the base string with the word "alligator" replacing the word "hippopotamus" highlighted.

FIG. 8B illustrates a range edit equivalent in which the edit presentation shows only the highlighted word "alligator" replacing the highlighted word "hippopotamus."

FIG. 8C illustrates a strikethrough and underlined version of a range edit equivalent on two separate lines.

FIG. 8D illustrates a strikethrough and underlined version of a range edit equivalent displayed as a single sentence with strikethrough and underlining.

FIG. 8E illustrates an abbreviated version of the base string with the highlighted word "alligator" replacing the highlighted word "hippopotamus."

Any number of edit presentations are possible to facilitate quick grading by the assessor. Any combination of highlighting, enlarging, font changes, underlining, strikethrough, color modifications, mouse-over detailed views, and/or other visual salient differences may be used to facilitate the quick identification of the student answers in the form of one or more string edits, or the equivalently converted range edit(s).

The system enables an assessor to grade single answers, string answers per a defined string answer grade rule, and/or multi-answer grading of many student answers simultaneously. For example, a grading subsystem may display an original string interaction problem along with one or more student answers in the form of range edits (potentially converted and normalized from the direct edit structure originally provided by the student). In one embodiment, a single student answer (range edit) is displayed, optionally in conjunction with the original string interaction problem. The assessor may grade the displayed student answer by associating one or more feedback objects therewith.

Figure 9:
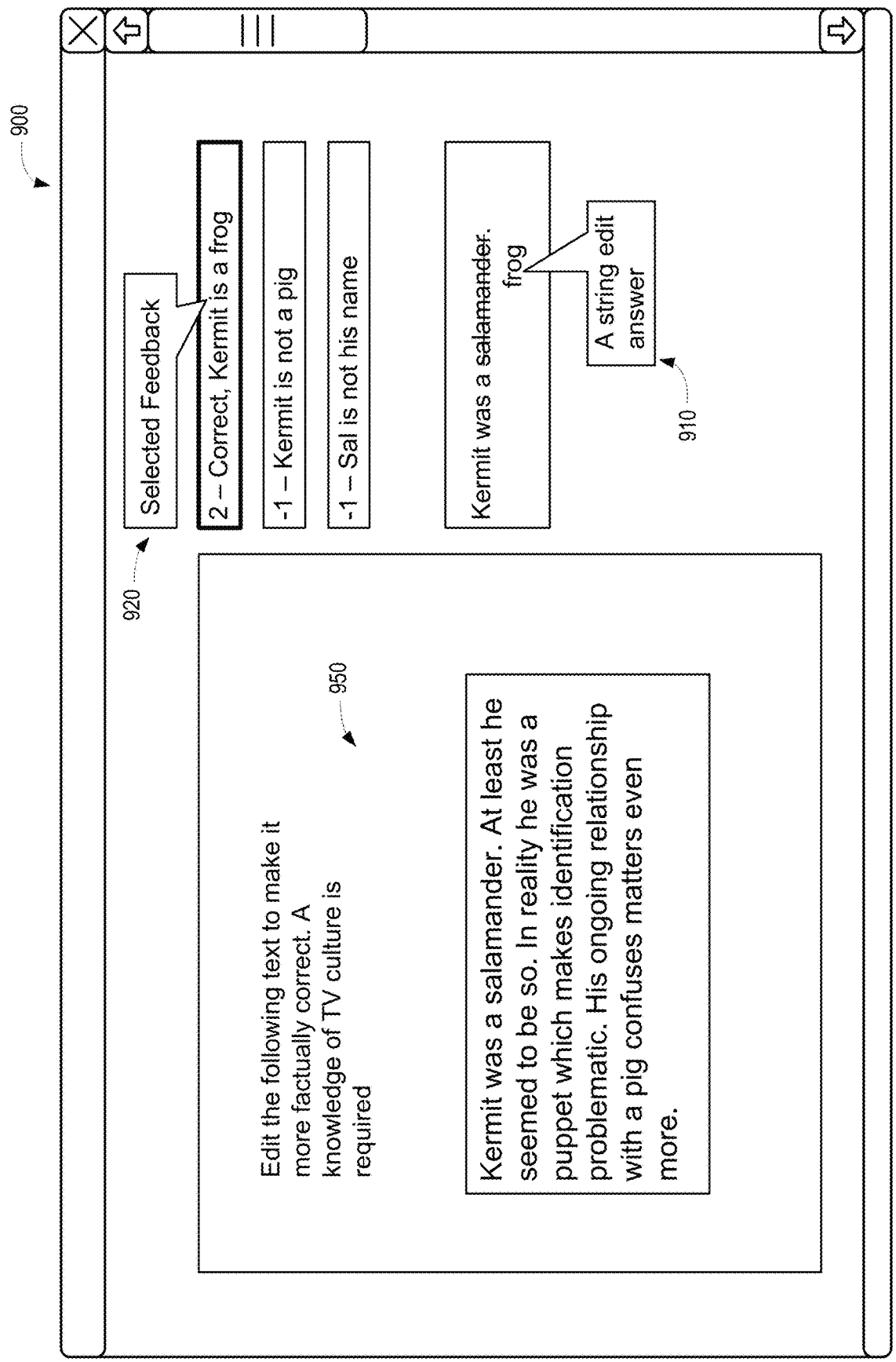
FIG. 9 illustrates the selective graphical display of edits that an assessor may assign as feedback objects to a student answer (string edit), according to one embodiment.

FIG. 9 illustrates the selective graphical display 900 of a string interaction problem 950, according to one embodiment. The graphical display 900 includes a student's string edit answer 910. A feedback object 920 is selected by an assessor to be applied to the student's string edit answer 910.

As described above, an assessor may associate a feedback object with a student answer (range edit). The system may automatically, or as instructed by an assessor, define a string answer grade rule that comprises a model string edit E and a feedback object F. The system can apply the string answer grade rules to all the student answers in a set of student answer S, where S contains an edit X where E==X. When the system identifies such a match, the feedback object F is automatically associated with the edit X of each student answer S.

In various embodiments, the string answer grade rule may also be associated with a string distance value, D, that defines a threshold distance from which student answers S can vary from the model string edit E and still have the feedback object F applied. In such an embodiment, the system would apply the string answer grade rules to all student answers in a set of student answer S, where S contains an edit X such that distance(E, X)<D. Regardless of whether the string answer grade rule requires a perfect match or a close match, from the assessor's perspective, the association of the feedback object F to any number of matching student answers S takes place simultaneously, instantaneously, and without any additional effort on the part of the human grader.

In many instances, multiple students will generate the same, correct answer. Multiple students may also generate the same wrong answer. Even when the test effectively allows for an open-ended string response, many students will provide the correct answer and many will provide the same, wrong answers. The system allows a human grader to more efficiently associate feedback objects with groups of identical or substantially identical edits. For example, the system may automatically, or as directed by the assessor, associate a feedback object with all identical range edits and/or all range edits within a defined distance. The distance can be calculated according to any of the various embodiments described herein.

Figure 10:
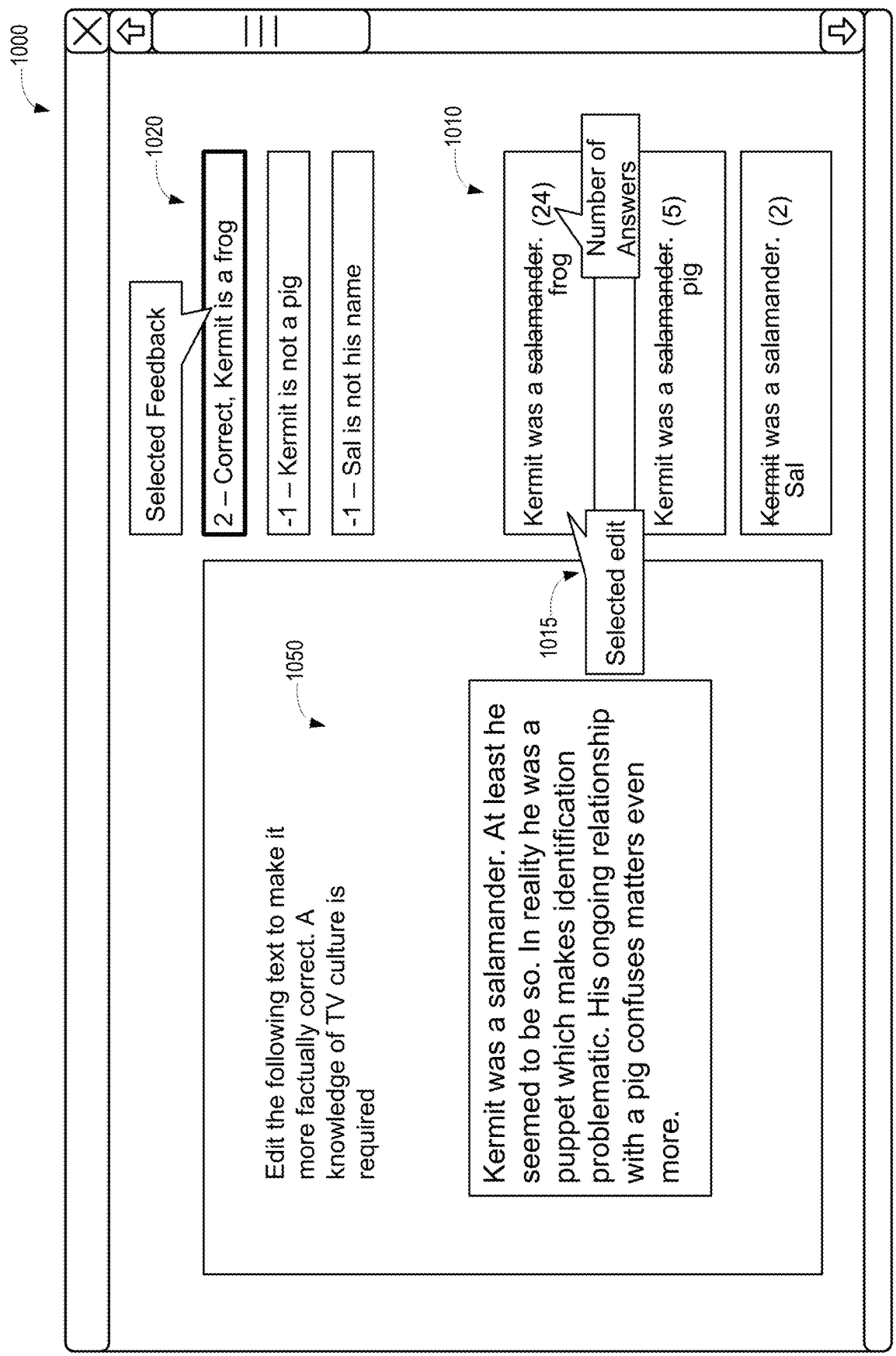
FIG. 10 illustrates a selective display of a total count of students who have answered in a particular way, according to one embodiment.

FIG. 10 illustrates a selective graphical display 1000 of a string interaction problem 1050, according to one embodiment. The graphical display 1000 includes three string edit answers 1010, each of which is associated with a count of the total number of students that made that same answer. An assessor has selected the feedback "Correct, Kermit is a frog" 1020 and selected the top string edit answer provided by 24 students, at 1015. The system allows the assessor to simultaneously assign the selected feedback 1020 with all 24 students who made the selected edit 1015.

In some embodiments, the system removes student answers from the display that have already been associated with a feedback object. This may help the human grader see what student answers remain to be graded. A human grader may define a variety of string answer grade rules for a problem, but it may be difficult or impossible in some instances to cover all of the possible ways in which a student may generate an answer. The system may allow a human grader to define a default string answer grade rule. The default string answer grade rule can be applied to all student answers that are not yet graded or associated with other string answer grade rules created by the assessor. Default string answer grade rules allow the human grader to deal with many wrong answers that are widely varied all at once, rather than having to grade them one by one.

In some instances, it may make sense for the assessor to assign a positive feedback object to the correct answer, a partial credit feedback object to a partially correct answer, and then a default zero credit or negative credit feedback object to every other answer.

In some cases, such as when there are many edits in many places across a base string, it may be overwhelming or difficult to visualize all of the student answers even when identical or sufficiently similar (i.e., within a threshold distance) answers are clumped together.

Figure 11:
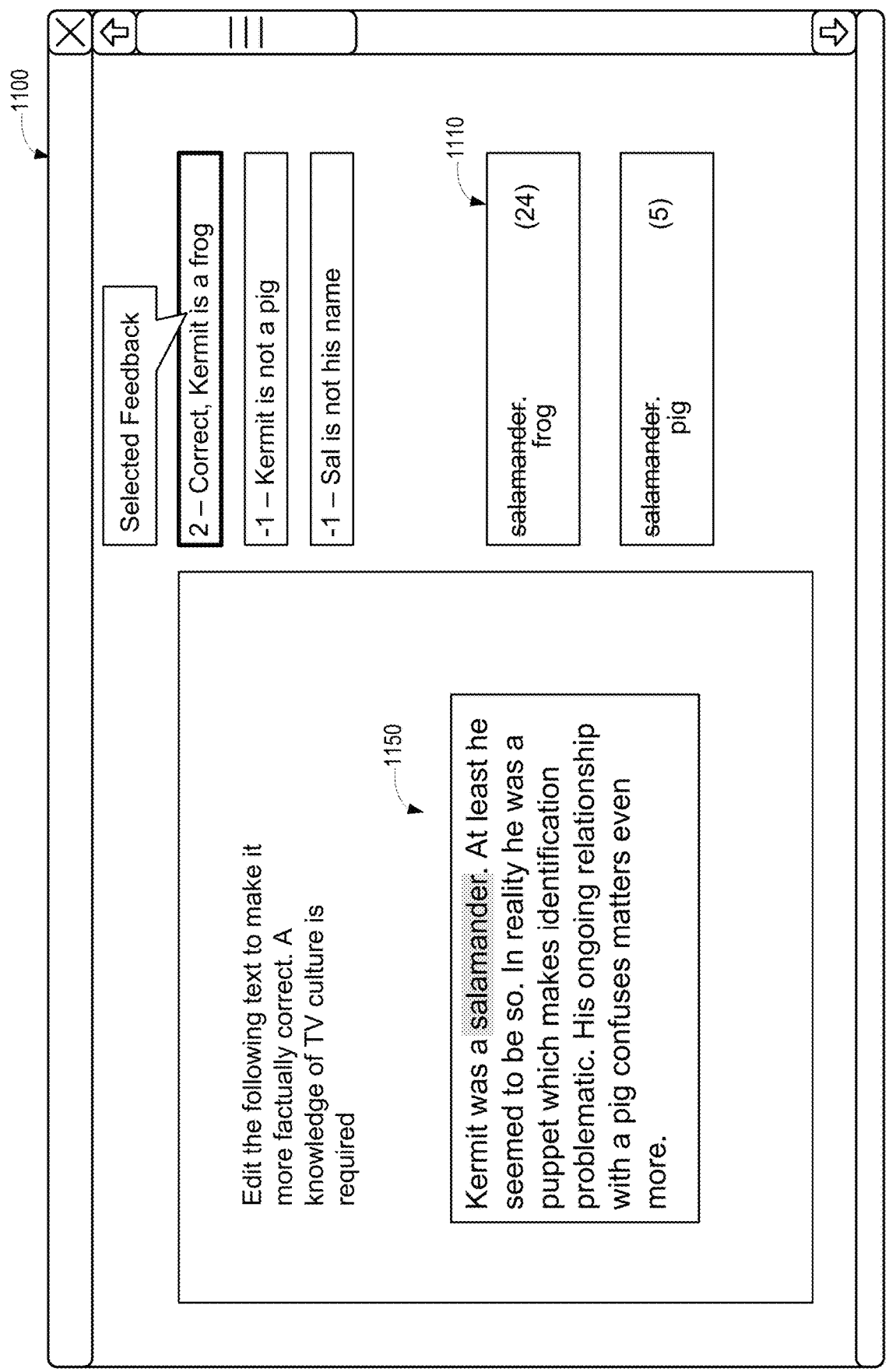
FIG. 11 illustrates an assessor selection of a portion of a base string to focus grading efforts and/or provide context for edits provided, according to one embodiment.

FIG. 11 illustrates a graphical display 1100 of an assessor selection (shaded) of a portion of a base string 1150 to focus grading efforts and/or provide context for edits provided, according to one embodiment. As illustrated, the selection of the word Salamander reduces the number of unique student answers to two, at 1110. If a focus selection has range F, then a range edit E can be selected by F if F contains E.range. We may also define the selection of E if F intersects E.range. The inclusiveness of the focus selection with a range F can be adjusted to suit a particular application.

Figure 12:
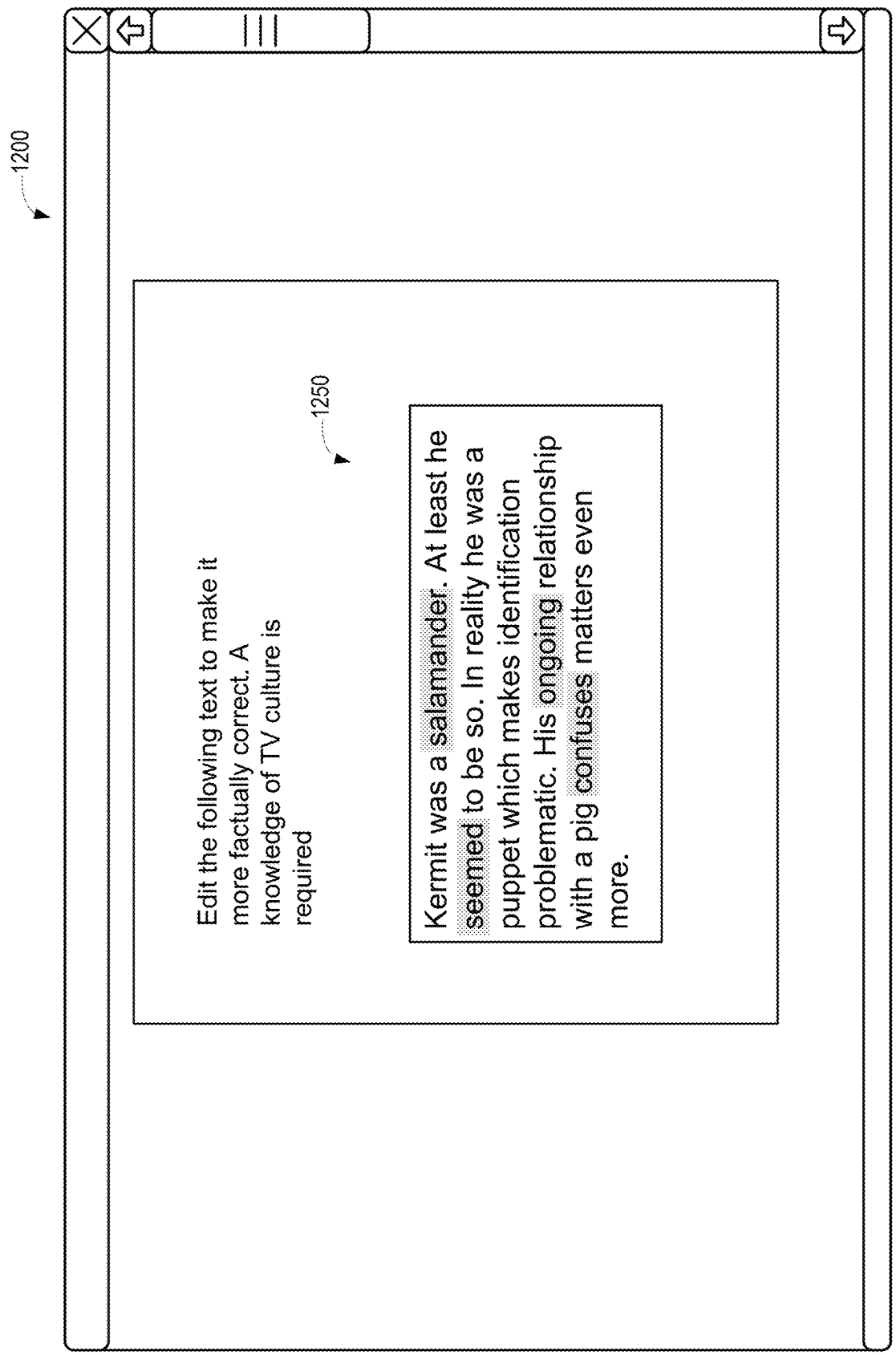
FIG. 12 illustrates a selective graphical display of the ranges in the base string within which there are student answers, according to one embodiment.

FIG. 12 illustrates a selective graphical display 1200 of the ranges in the base string 1250 within which there are student answers, according to one embodiment. For example, the system may provide a visually salient display of the locations of ungraded student edit answers within the base string. In the illustrated embodiment, the ranges in the base string where there are student answers not yet graded are highlighted.

The highlighted ranges can be described as belonging to a set of student answers S, where for each answer A in S we highlight A.range in the presentation of the base string 1250. The answers in S that are already graded by a previously defined string answer grade rule can be omitted in the highlights to provide visual salience of the ungraded student answers are located.

Figure 13:
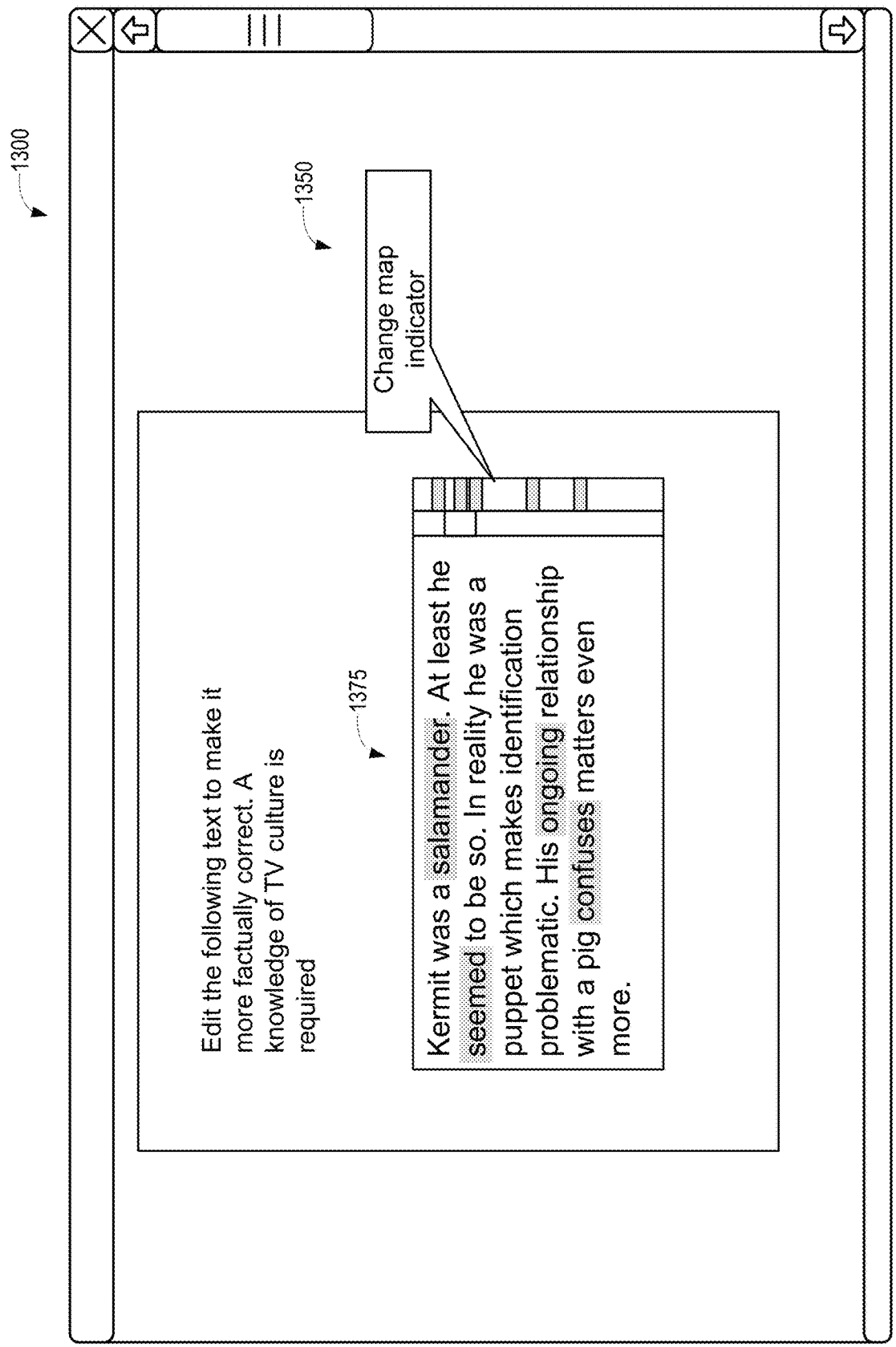
FIG. 13 illustrates a modified graphical display of the ranges that incorporates a change map indicator on the scroll bar to indicate the location of such ranges, according to one embodiment.

FIG. 13 illustrates a modified graphical display 1300 of the ranges that incorporates a change map indicator 1350 on the scroll bar to provide an indication of the location of the ranges corresponding to student answers S that have not yet been graded, according to one embodiment. In some cases, the base string 1375 is larger than can be displayed on the display 1300 at one time. The change map indicator 1350 may be displayed on the scroll bar as a linear region that is aligned with the scrolling direction. The change map indicator 1350 is divided into an integer number of discrete change regions. Each line in the base string 1375 is mapped to a corresponding change region. This mapping of lines to change regions can be many to one. If there is a student answer A such that A.range includes characters of some line L, then the change region C=L.map( ) is modified (highlighting, bold, underlining, colored, etc.) to provide visual salience with respect to the other portions of the base string 1375.

Figure 14:
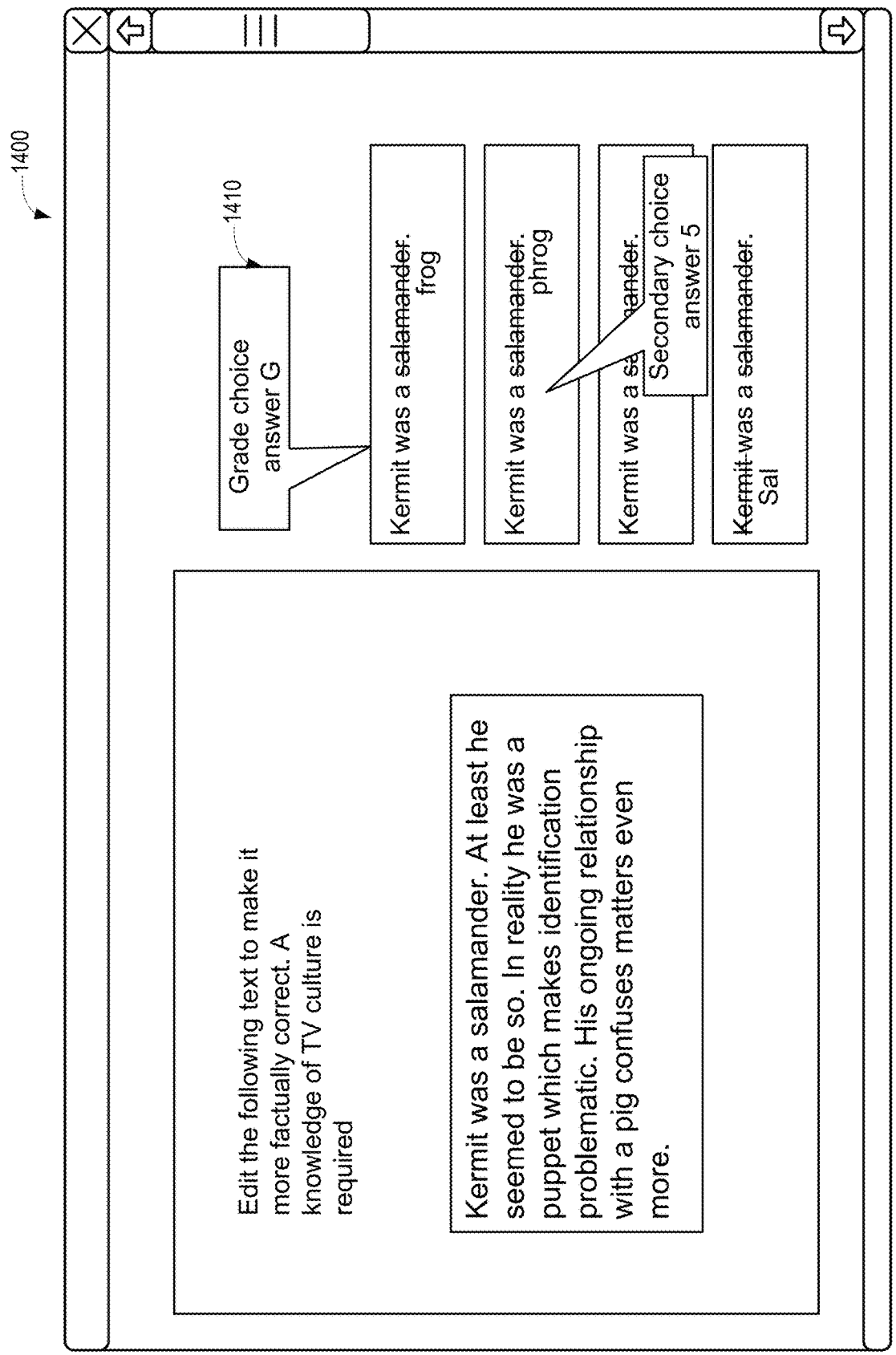
FIG. 14 illustrates an edit structure distance grading rule in which the grading rule is made to apply to edit structures that match as well as edit structures that are similar, according to various embodiments.

FIG. 14 illustrates a graphical display 1400 of implementation of an edit structure distance grading to show edit structures that match or are computed to be within a threshold distance, according to various embodiments. Once a particular student answer edit structure G 1410 has been selected for grading (by single answer grading or multi-answer grading), the system takes other answers A that are still ungraded and can compute D(G,A) where D is a distance function between two edit structures. We can then sort all such answers A in ascending order of D(G,A) and present the nearest N answers on the screen in order. This displays all answers that are closest to G according to the distance function D( ). The human grader can then select a secondary answer S, such as second choice answer 5, from the set of displayed answers that are similar to G. The system may create a string answer grade rule R based on G and S that will match all answers M such that D(G,S)>=D(G,M) to select all edit structures that are similar to G up to a limit of D(G,S).

Figure 15:
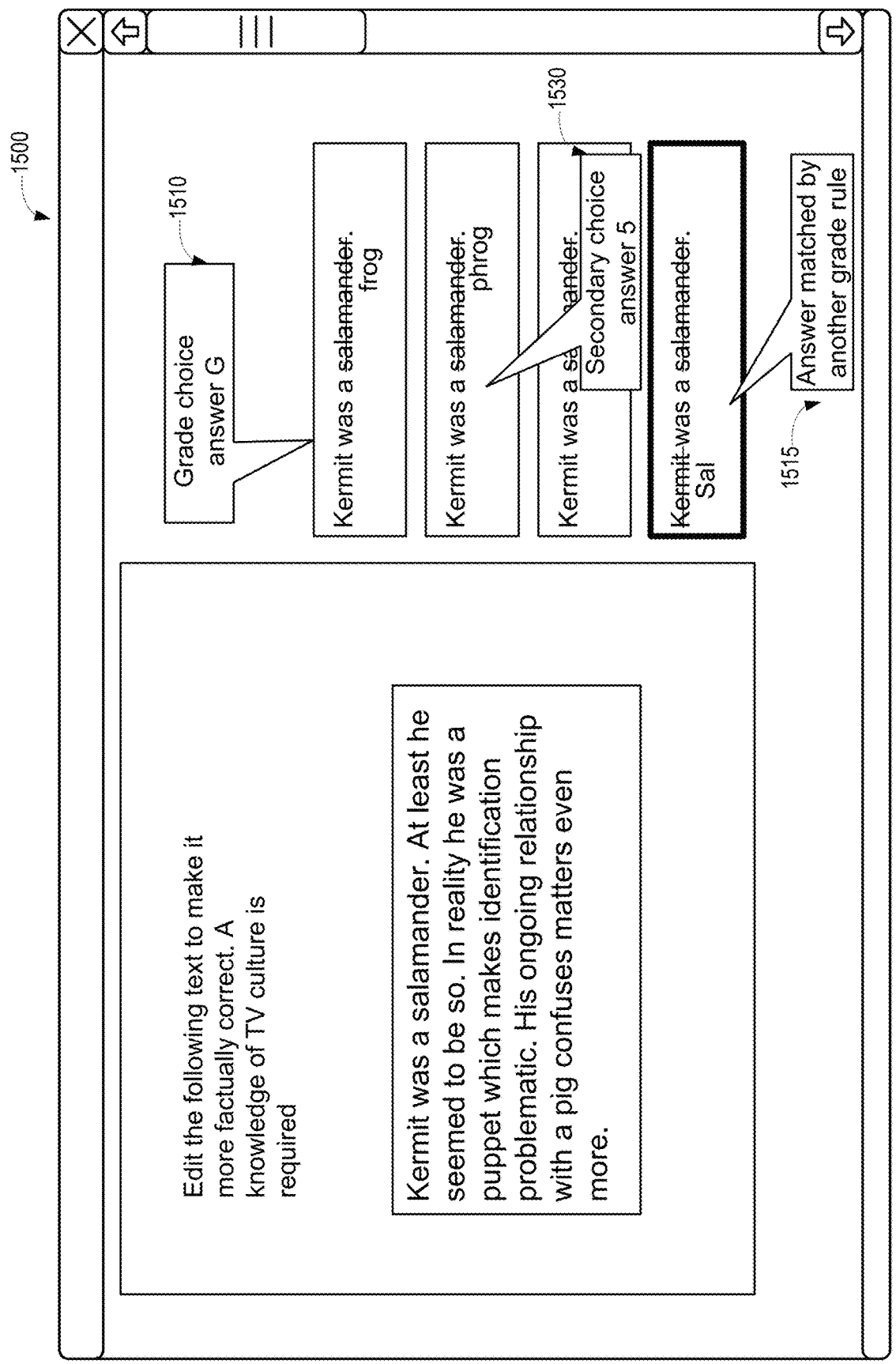
FIG. 15 illustrates a graphical user interface of highlighted answers that are already matched by another grade rule, according to one embodiment.

FIG. 15 illustrates a graphical user interface 1500 that includes a highlighted answer 1515 that are already matched by another string answer grade rule, according to one embodiment. When selecting a secondary choice answer 1530 to define a limit on the distance from the grade choice answer 1510, human graders may not be able to easily quantify their selections. In some instances, this may result in human graders inadvertently creating string answer grade rules that overlap other string answer grade rules. The system may highlight answers in the distance-based grading to visually show the human grader which student answers have already been matched by a previously created string answer grade rule. The human grader can avoid overlap and/or be aware of and accept the overlap.

Figure 16:
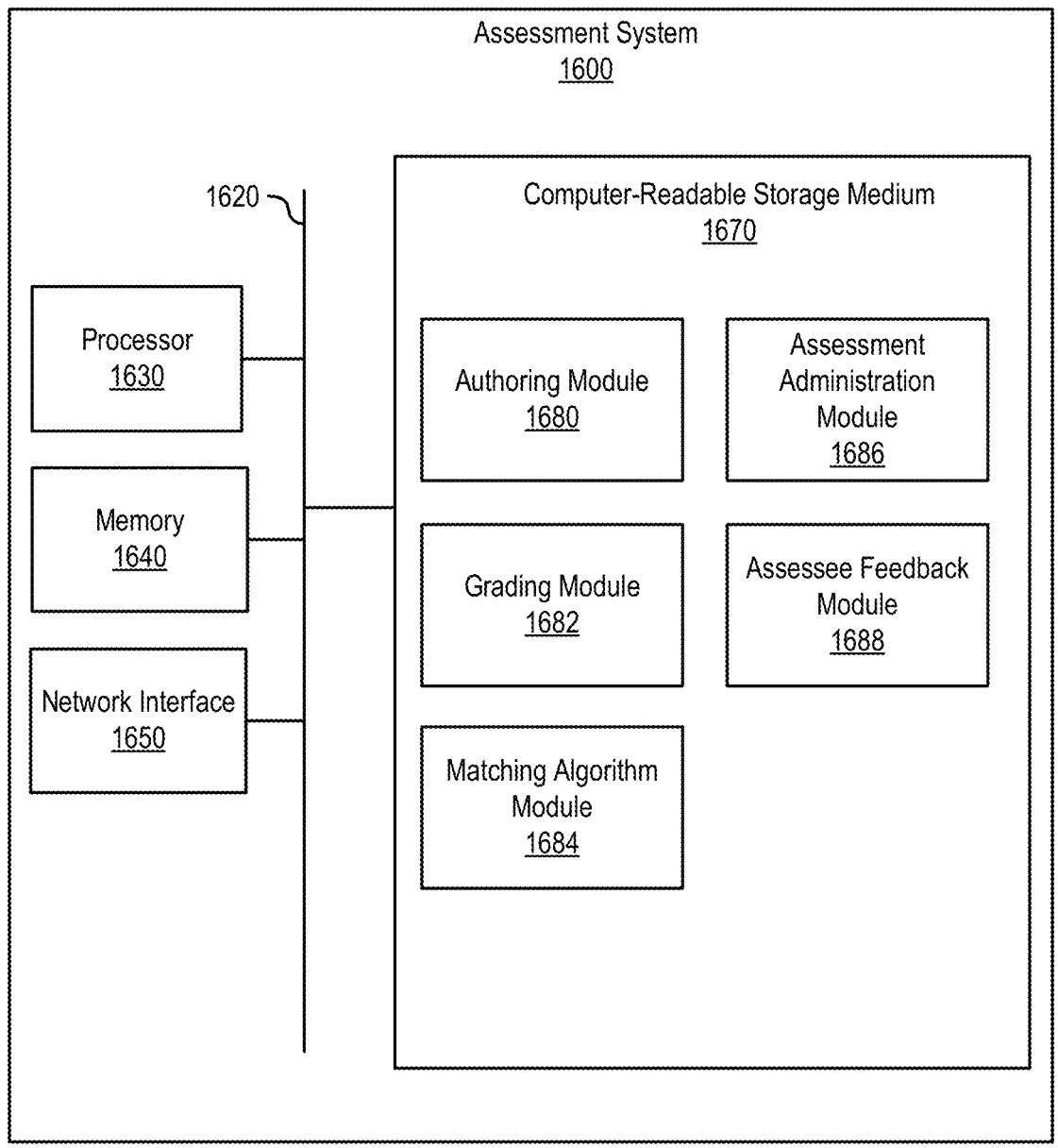
FIG. 16 illustrates a functional block diagram of one embodiment of an assessment system to implement one or more embodiments and subsystems described herein.

FIG. 16 illustrates a functional block diagram of one embodiment of an assessment system to implement one or more embodiments and subsystems described herein. As illustrated, an assessment system 1600 may include a processor 1630, memory 1640, and a network interface 1650 that are connected to a non-transitory computer-readable storage medium 1670 via a bus 1620. The non-transitory computer-readable storage medium 1670 may be replaced by any combination of hardware, firmware, and software.

As illustrated, the non-transitory computer-readable storage medium 1670 includes an authoring module 1680 to implement the features and functions described herein in conjunction with the authoring subsystem. A grading module 1682 may implement the features and functions described herein in conjunction with the grading subsystem. A matching algorithm module 1684 may implement the features and functions described herein relating to determining similarity, differences, distances, rule matching, etc. Matching algorithm module 1684 may be implemented alternatively as a distance calculation subsystem, implemented in hardware, software, and/or firmware, to determine if two strings are the same or within a threshold distance of one another. In some embodiments, a processor, microcontroller, or FPGA may be utilized to perform the mathematical computations involved with the distance calculation algorithms described herein.

An assessment administration module 1686 may implement the features and functions described herein in conjunction with the administration subsystem. The Assessee feedback module 1688 (e.g., a feedback module or feedback subsystem) may implement the features and functions described herein relating to associating feedback objects with student answers.

This disclosure has been provided in the context of numerous examples and variations, including the best mode. However, those skilled in the art will recognize that changes and modifications may be made to the exemplary embodiments without departing from the scope of the present disclosure. While the principles of this disclosure have been shown in various embodiments, many modifications of structure, arrangements, proportions, elements, materials, and components may be adapted for a specific environment and/or operating requirements without departing from the principles and scope of this disclosure. These and other changes or modifications are intended to be included within the scope of the present disclosure.

This disclosure is to be regarded in an illustrative rather than a restrictive sense, and all such modifications are intended to be included within the scope thereof. Likewise, benefits, other advantages, and solutions to problems have been described above with regard to various embodiments. However, benefits, advantages, solutions to problems, and any element(s) that may cause any benefit, advantage, or solution to occur or become more pronounced are not to be construed as a critical, required, or essential feature or element. The scope of the present disclosure should, therefore, be interpreted to encompass at least the following claims:

What is claimed is:

1. An automated grading system for string-edited assessments, comprising:
(I) an administration subsystem to
  (A) transmit, for electronic display,
    (i) a string interaction problem that includes a text string in a string data structure, and (ii) instructions for each of a plurality of students to provide an answer by editing at least a portion of the text string of the string interaction problem in the string data structure, and (B) receive student string edits as answers to the string interaction problem from the plurality of students;

(II) a grading subsystem to (A) display at least the string interaction problem, (B) receive, from a human grader, a first string answer grade rule, including a first model string edit, a first feedback object, and a first threshold string distance, and (C) receive, from the human grader, a second string answer grade rule, including a second model string edit, a second feedback object, and a second threshold string distance;

(III) a distance calculation subsystem to compute string distances between each of the plurality of student string edits and each of the first and second model string edits; and (IV) a feedback subsystem to (A) automatically assign the first feedback object to student answers corresponding to the student string edits computed to be within the first threshold string distance of the first model string edit, and (B) automatically assign the second feedback object to student answers corresponding to the student string edits computed to be within the second threshold string distance of the second model string edit.

2. The automated grading system of claim 1, wherein the distance calculation subsystem is configured to:

normalize the first model string edit by converting it to a first range edit set;

normalize the second model string edit by converting it to a second range edit set; and normalize each of the plurality of student string edits by converting each student string edit to a unique student range edit set.

3. The automated grading system of claim 2, wherein the distance calculation subsystem is configured to compute the string distance as an edit structure distance function (EDF) based on a sum of weighted reference distance functions (RDF) and string distance functions (SDF), such that for any two normalized range edit sets A and B:

$$EDF(A,B)=X*RDF(A.\text{start},B.\text{start})+Y*SDF(A.\text{replace},B.\text{replace})+Z*RDF(A.\text{end},B.\text{end}),$$

where X, Y, and Z are weighting values.

4. The automated grading system of claim 3, wherein $X=Y=Z$.

5. An automated grading system for student-edited character string assessments, comprising:

a processor;

an electronic display in communication with the processor;

an electronic input device in communication with the processor to facilitate user input relative to images displayed via the electronic display; and a computer-readable medium storing instructions that, when executed by the processor, cause the processor to perform operations for automated grading assistance of character string assessments, the operations comprising:

displaying, via the electronic display, a string interaction problem that includes a text string in a string data structure;

displaying, concurrent with the string interaction problem, a first student string edit to the text string of the string interaction problem in the string data structure responsive to the string interaction problem provided by each of a first number of students as student answers to the string interaction problem;

receiving, from a human grader via the electronic input device, a model string edit, a first feedback object, and a string threshold distance;

computing a string distance between the model string edit and the first student string edit; and automatically, via the processor, assigning the first feedback object to the first student string edit provided by each of the first number of students based on a determination that the computed string distance is less than the string threshold distance.

6. The automated grading system of claim 5, wherein the first student string edit comprises one of: paired tags, an XML markup, an HTML markup, an RTF file, and a propriety encoding format.

7. The automated grading system of claim 5, wherein the first student string edit comprises a replacement of at least one word of the text string of the string interaction problem.

8. The automated grading system of claim 5, wherein computing the string distance between the first student string edit, $S_i$, and the model string edit, M, comprises calculating an edit structure distance function (EDF) as a sum of weighted reference distance functions (RDF) and string distance functions (SDF), such that:

$$EDF(S_i,M)=X*RDF(S_i.\text{strt},M.\text{strt})+Y*SDF(S_i.\text{replace},M.\text{replace})+Z*RDF(S_i.\text{end},M.\text{end}),$$

where X, Y, and Z are weighting values.

9. The automated grading system of claim 5, wherein the operations further comprise:

receiving, from the human grader via the electronic input device, a second feedback object to be assigned to the first student string edit; and automatically, via the processor, assigning the second feedback object to the student answers provided by the first number of students who provided the first student string edit in response to the string interaction problem.

10. The automated grading system of claim 5, wherein the computer-readable medium comprises one of RAM, an SSD, and a magnetic disk drive.

* * * * *